Nov. 11, 1958   D. V. EDWARDS ET AL   2,860,268
STRUCTURES FOR GRID CONTROL GAS TUBES
Filed March 9, 1954   4 Sheets-Sheet 1

*INVENTORS*
D.V. EDWARDS AND
E.K. SMITH
BY
Neil L. Preston
THEIR ATTORNEY

Nov. 11, 1958 D. V. EDWARDS ET AL 2,860,268
STRUCTURES FOR GRID CONTROL GAS TUBES
Filed March 9, 1954 4 Sheets-Sheet 2

*INVENTORS*
D.V. EDWARDS AND
BY E.K. SMITH
THEIR ATTORNEY

INVENTORS
D.V. EDWARDS AND
E.K. SMITH
BY
THEIR ATTORNEY

United States Patent Office 2,860,268
Patented Nov. 11, 1958

2,860,268

STRUCTURES FOR GRID CONTROL GAS TUBES

Donald V. Edwards, West Orange, and Earle K. Smith, Montclair, N. J., assignors to Electrons, Incorporated, Newark, N. J.

Application March 9, 1954, Serial No. 414,961

8 Claims. (Cl. 313—38)

This invention relates to electron discharge tubes, and more particularly to hot cathode grid control gas tubes of the higher current ratings.

In many applications and uses of grid control gas tubes, it is desirable for various reasons that the tubes should be short or squatty, to reduce the space needed for the tube in the apparatus unit. In tubes of the higher current ratings, capable of conducting amperes of current, the heat evolved by electron bombardment of the anode is large, and a hot cathode capable of providing the rated conduction current is also a source of substantial heat. Stable grid control and acceptable tube operation call for dissipation and distribution of such heat in a manner to provide appropriate temperature levels for certain parts. For example, the control element or grid is subject to heat radiated from the anode and the hot cathode, and also absorbs some heat from the discharge, and yet the grid must be relatively cool during operation, otherwise it tends to become emissive and lose control. Also, the region of the seals for the lead-in connections to the electrodes must be kept at the appropriate low temperature level during operation, otherwise a break-down or permanent stressing of the seals is likely to occur. Such requirements for heat dissipation and distribution impose limitations upon the dimensions and space relationship of the parts in a practical tube structure.

With these and other considerations in mind, the primary object of this invention is to devise the appropriate structural features for heat dissipation or distribution to provide a satisfactory tube of this kind which is short or squatty in comparison with conventional tubes of like current ratings.

Generally speaking, it is proposed in accordance with this invention to arrange heat shielding and heat dissipating elements in connection with the electrodes and the seals for their lead-in connections in a manner to provide the desired temperature levels of the various parts in a compact electrode assembly closely spaced to the ends of the tube envelope. More specifically, it is proposed to utilize heat shielding and heat dissipating surfaces in connection with the control grid to permit close spacing of the grid with respect to the anode and cathode in a compact braced electrode assembly without undue overheating of the grid, to support this electrode assembly directly on a sealing or mounting base constituting the lower end of the tube envelope in a manner permitting the use of short electrode lead-in connections without overheating their seals, and to employ a baseless mount of exposed heat dissipating supporting elements rigidly attached to the electrode lead-in connections close to their seals, these various structural features cooperating to provide a tube that is short and squatty for its rating and takes up less space for its use in an equipment unit.

Various other specific structural features, attributes and advantages of the tube structure of this invention will be in part apparent, and in part pointed out as the description progresses.

Although the novel structural features of this invention may take various specific forms, and may be incorporated in various designs and types of grid controlled gas tubes, it is convenient in describing the invention to refer to one specific structural organization and arrangement of parts as illustrated in the accompanying drawings to represent a typical embodiment of the invention.

Figures 2, 3, 4:
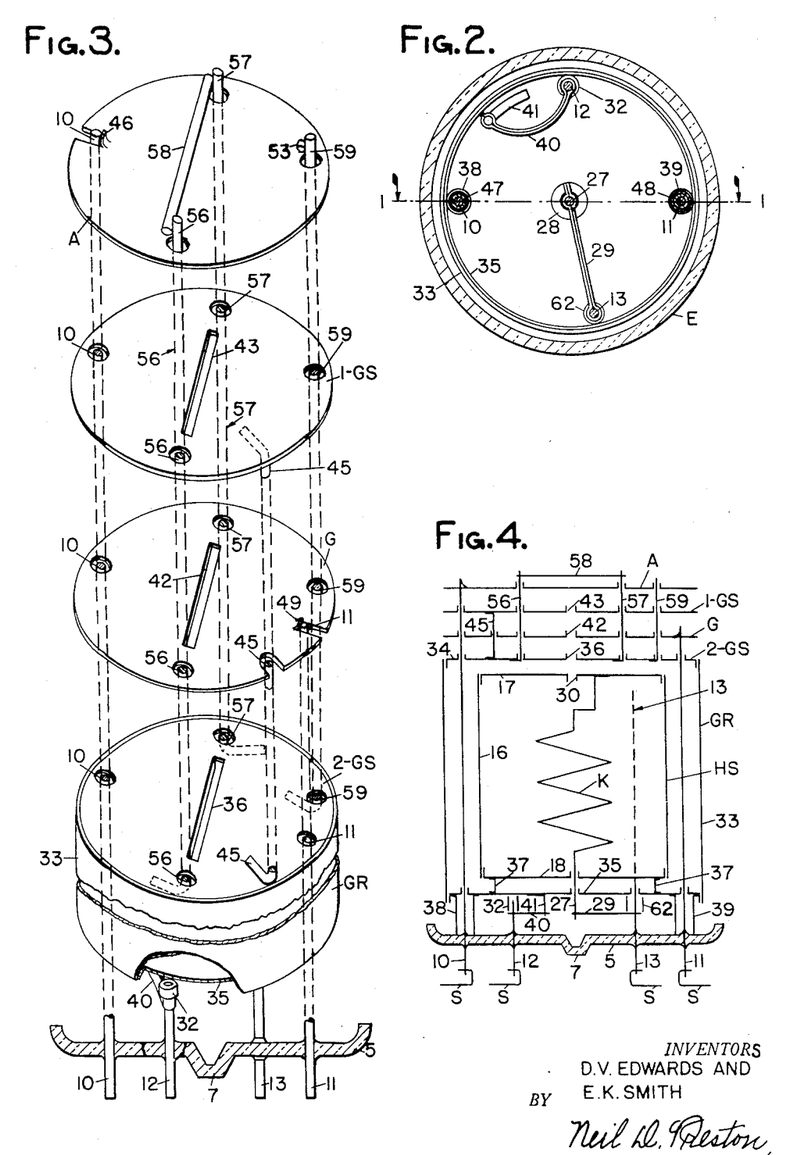
Fig. 2 is a transverse section through the tube on the line 2—2 of Fig. 1, to a smaller scale, to illustrate the space relationship of the electrode lead-in rods and certain strap connections thereto.
Fig. 3 is an exploded perspective view to illustrate the relationship of the parts forming the metal framework of the compact assembly of this invention, the insulated spacers and separators, also forming part of the assembly having been omitted in the interests of clarity.
Fig. 4 is a schematic or diagrammatic showing of the metal elements constituting the electrodes and associated parts in the assembly.

*Functional characteristics.*—Before considering the detail construction and arrangement of parts for the typical embodiment of the invention illustrated, it is expedient to outline generally the structural and fundamental organization of a tube structure characteristic of this invention from the standpoint of purpose and function, referring to the diagrammatic representation in Fig. 4.

Generally speaking, the space required for use of a grid control gas tube of a given current capacity or rating in an equipment unit depends upon the overall length of the tube itself, and the space required for detachably supporting this tube on the tube supporting body or chassis of the equipment unit. In general, these dimensions depend upon the space relationship and proportioning the parts required to provide adequate mechanical stability against shock and vibration, satisfactory electrical performance, and proper temperature levels for certain parts, more particularly the regions of the glass-to-metal seals for the electrode lead-in connections. These rather complex conditions affecting the tube dimensions are conveniently discussed separately, although they are in fact interrelated and the ultimate result is due to their cooperation.

Considering first the electrode assembly, which takes up part of the overall length of the enclosing tube envelope, the tube of the type contemplated comprises a heated shielded hot cathode, an anode, and a control element or grid disposed between the anode and cathode for controlling conduction through the tube. These tube elements and associated parts characteristic of the invention are represented diagrammatically in Fig. 4. The hot cathode K, assumed to be directly heated, is wholly enclosed in a heat shield HS in the usual manner, except for a discharge opening indicated at 30. The grid G is interposed between this heat shielded cathode and the anode A.

In accordance with this invention, additional heat shielding and heat dissipating elements are added to these conventional electrodes; and the various parts are constructed and interconnected in the appropriate space relationship and with suitable electrical installation to obtain satisfactory tube performance and mechanical stability in a compact braced electrode assembly.

In the type of tube under consideration, it is desirable to have a small volume of ionizable gas in the region between the anode and the grid. This reduces the number of positive ions existing at the end of the conduction period and the length of their average paths of movement to a deionizing surface so as to reduce ionic bombardment of the anode. Similarly, in the interests of shortening the time of effective deionization for the grid to regain control after conduction, it is desirable to have a small space or volume as between the grid G and the heat shielded cathode. During operation of the tube, however, the anode and the cathode assume high temperatures, and the desired close space relationship between them and the grid tends to raise the temperature of the grid and make it emissive and lose control.

To take care of these conditions in the tube of this invention, a heat shielding element, conveniently termed an upper grid shield 1–GS, is disposed between the anode A and grid G, and serves to shield or screen the grid from heat radiated from the hot anode. A similar lower grid shield 2–GS is interposed between the hot cathode and the grid G to shield it from the cathode heat. Further, these upper and lower grid shields 1–GS and 2–GS are connected to a heat dissipating element, conveniently termed a grid radiator GR, which is capable of radiating heat effectively to the outside of the tube, thereby keeping these grid shields cool and in turn the grid G between them.

In the particular structure illustrated, this grid radiator GR is in the form of a cylindrical can, which constitutes the outermost part of the assembly of tube elements, and has an extensive surface to radiate heat to the outside of the tube. Also, in this particular arrangement shown, the lower grid shield 2–GS is conveniently formed as the top of this grid radiator can GR, and the upper grid shield 1–GS is connected to it by suitable heat conducting parts, such as the strip or rod 45.

The outer cylindrical surface of the grid radiator GR is sand blasted, oxidized or otherwise treated for efficient heat radiation, while its inner surface is bright and even polished if desired to reflect heat. Thus, while the grid radiator can GR is disposed around the cathode K and its heat shield HS, and in effect adds to the heat shielding of the cathode, this grid radiator can also afford an extensive and efficient heat radiating surface for dissipation of heat to the outside of the tube to keep the grid shields and the grid between them cool. In this connection, in order that the grid shields 1–GS and 2–GS may absorb as little heat as possible from the anode and cathode, the outer surface of these shields facing these sources of heat are preferably bright. The thickness of these shields and their heat conducting connections to the heat radiated surfaces of the grid radiator GR are designed to maintain a level of temperature to keep all parts of the grid between them cool.

In order to facilitate establishing and maintaining the desired close space relationship between these parts to keep down the volumes of ionizable gas for reasons previously mentioned, the anode A, grid G, and the upper and lower grid shields 1–GS and 2–GS are preferably essentially flat plates, and are interconnected at a plurality of points over their surfaces by metallic elements and insulator spacers, as later described in detail, to form a compact assembly of substantial rigidity. The close spacing between these plates is preferably in the order of the electron means free path for the gas pressure, so that the paths for electron movement between opposing surfaces at different potentials is too short for effective ionization. During operation of the tube substantial differences of potential exist as between the anode and grid and its shields, and if the space relationship of these parts should afford long ionizing paths, a glow discharge is likely to be initiated and cause a misfire or arc back, thus limiting the voltage rating for the tube.

These various tube electrodes, including the hot cathode, anode, grid and associated parts, have to be supported inside the tube envelope with substantial rigidity to maintain the prescribed space relationship under shock and vibration. Furthermore, it is necessary to provide suitable lead-in connections for these electrodes passing through gas tight seals in the tube envelope. In this connection, the electrodes and associated parts in a gas tube assume high temperatures during operation and degassing, say in the order of 800 to 900° C.; whereas safe operating temperature for a glass-to-metal seal is much lower, say in the order of 300° C. Consequently, any structural organization for supporting the electrodes and providing their lead-in connections must dissipate and distribute heat in a manner to avoid over heating the seals.

In conventional tubes of the type under consideration, the electrode lead-in rods, in addition to providing the desired electrical connections and conductivity, also constitute the principal, if not the sole, support for these electrodes within the tube envelope. Under such conditions, the cross-section and length of the lead-in wires must be chosen to provide an electrode support of adequate rigidity to withstand shock and vibration, in addition to their functions of electrical conductivity as electrode lead-in connections. A given lead-in rod capable of supporting at a point remote from its seal an electrode mass with adequate rigidity is subject to bending moments which call for a substantial cross-section per unit of length. Such large cross-section has such a high heat conductivity per unit of length that a substantial length of rod is required to establish a temperature gradient between its seal and the hot electrode mass sufficient to avoid over heating its seal. The net result is an increase in the overall length of the tube.

In the tube of this invention, the electrode masses are incorporated in a compact assembly which is bodily supported as a whole directly upon the sealing base at the lower end of the tube envelope, and is propped or braced against sidewise displacement in such a manner that the electrode lead-in rods are no longer subjected to material bending moments, and may be designed for conduction of heat and current rather than mechanical stiffness. Further, the tube as a whole is bodily supported on a baseless mount capable of dissipation of heat from the lead-in rods to the outside air more effectively than when a conventional base and socket tube mount is used. Such support of the electrode assembly on the sealing base of the tube envelope largely independent of the stiffness and rigidity of the lead-in rods, together with the baseless mount for bodily supporting the tube, have a combined effect of permitting the use of short length lead-in rods as between the hot electrodes and the supporting body or chassis of the tube, thereby providing a tube that is short and squatty for its rating and takes up less space in the equipment unit than the conventional tube.

Considering the electrode supporting means characteristic of this invention, the compact electrode assembly of anode and grid, together with the grid shields and heat shielded cathode above described, are connected with substantial rigidity and the appropriate electrical insulation between parts to the outer grid radiator can GR, as diagrammatically represented in Fig. 4, and hereinafter described in more detail. This outer grid radiator can GR, together with the associated electrode assembly, is bodily supported on the glass sealing base or mounting stem 5, constituting the lower end of the tube envelope. The lead-in rods for the various electrodes, four in the arrangement shown, are sealed at approximately equally spaced points in this sealing base 5. These spaced electrode lead-in rods, together with associated sleeves or collars, are arranged to provide in effect a plurality of spaced posts or pillars, like the legs of a stool, for supporting the grid radiator can GR and associated electrode assembly on the sealing base 5. The forces of shock and vibration tending to cause sidewise displacement of the electrode masses and associated parts are thus transmitted longitudinally of the tube directly to the sealing base 5 at a plurality of spaced points, and little if any bending moments are applied to the lead-in rods. In the particular arrangement illustrated, two of these supporting posts are provided by sleeves 38 and 39 around the anode and grid lead-in rods 10 and 11 and directly engaging the sealing base 5. The function of the other two supporting posts is provided by insulator collars 32 and 62 around the other lead-in rods 12 and 13 and interposed between strap connectors 29 and 40 on these rods and the bottom of the grid radiator can GR, as later described in detail.

It can be seen that the desired rigidity of electrode support under shock and vibration is obtained in such a structural organization without subjecting the lead-in rods to material bending moments. Hence, the cross section of these rods is not dictated by mechanical stiffness, and they do not have to be made long enough for such cross section to provide the temperature gradient required to avoid overheating their seals. The lead-in rods may be of a smaller cross section suitable for electrical conductivity rather than mechanical stiffness, and the length of such lead-in rods between their seals and the hot electrode masses may be shorter without overheating the seals, with the result that the whole assembly of tube elements may be located closer to the sealing base 5 without overheating the seals for the necessary electrode lead-in connections, thereby materially reducing the overall length of the tube envelope for its current rating.

The operating temperature of the electrode lead-in rods at the region of their glass-to-metal seals is dependent upon the rate of dissipation of the heat coming from the hot electrode masses and the heating effect of the current conducted by the lead-in rods. In order to maintain a low temperature level at the seal regions, it is important to dissipate heat from these regions to the outside air as efficiently as possible. In the usual base and socket mount for tubes, the external portions of the electrode lead-in rods, together with their electrical connections through the pins of the base and the socket springs, are largely isolated and heat shielded from the outside air. Hence, the electrode lead-in rods at the region of their seals tend to assume an elevated temperature under normal operating conditions, and a small increase in temperature under overload and other abnormal temperature conditions will damage the seals. In a tube of this invention, the usual base and socket type of tube mounting is eliminated, and the tube is detachably mounted on the main tube supporting body or chassis in a suitable manner for efficient dissipation of heat from the electrode lead-in rods to the outside air to establish a low temperature at the region of their seals, and also afford heat dissipating capacity to avoid overheating and damaging the seals under abnormal overload conditions.

In the type of such baseless mount illustrated, a plurality of supporting elements or feet S are rigidly attached to the outer ends of the electrode lead-in rods close to their seals, and are constructed to be detachably connected to suitable insulating terminals of the tube supporting body or chassis so as to permit ready application and removal of the tube in the same manner afforded by the conventional base and socket mount. These supporting elements or feet S, diagrammatically illustrated in Fig. 4 and later described more in detail, are fully exposed to the outside air, and can efficiently dissipate heat from the seal regions by radiation and air convexion. This baseless mount cooperates with the small and short electrode lead-in rods previously discussed to afford a short and squatty tube for its rating, without having damaging overheating of the seals for these rods under the conditions encountered in practice.

With this general survey of the functional features characteristic of this invention, consideration may be given to the particular construction and arrangement of parts illustrated in Figs. 1 to 8 for accomplishing these useful results.

Figures 1, 1A:
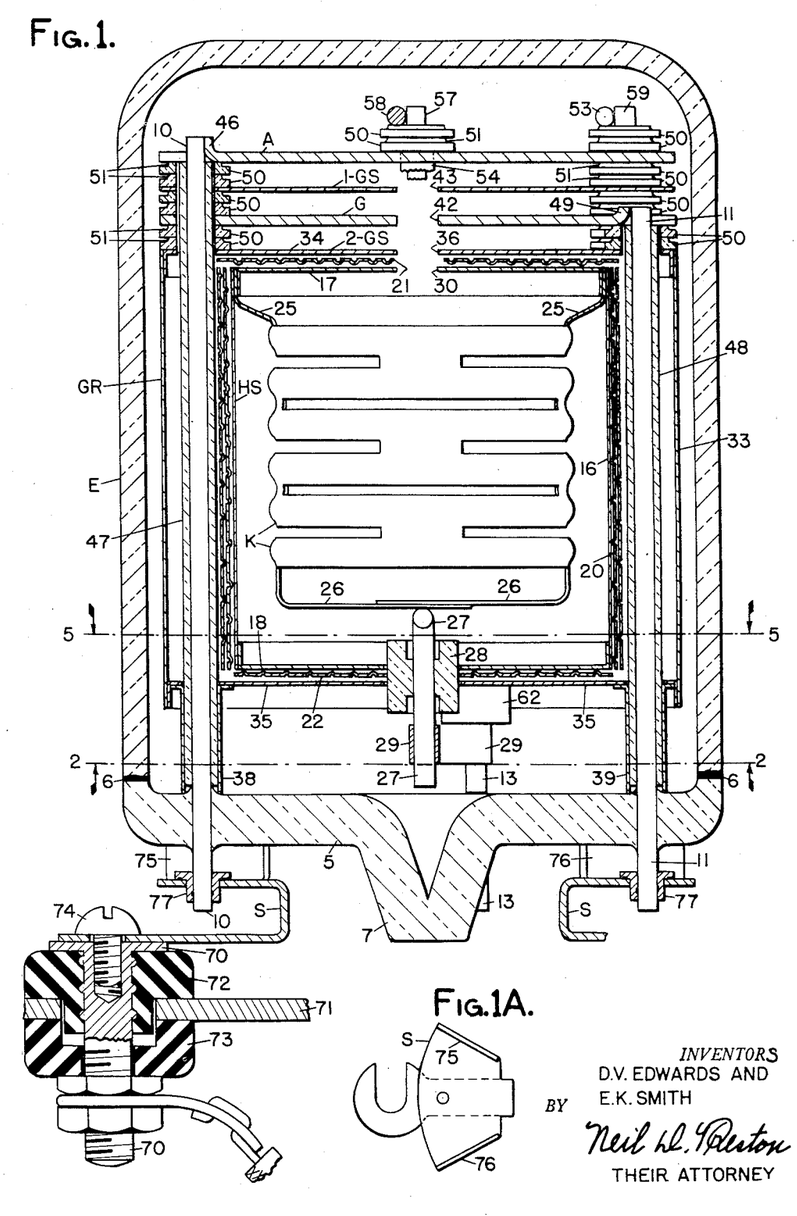
Fig. 1 is a general view in the form of a vertical section through a typical tube of this invention, said section being taken on the line 1—1 indicated in Fig. 2.
Fig. 1A shows a tube supporting element or foot separately before attached to an electrode lead-in rod.

*Tube structure of Figs. 1 to 8.*—The whole electrode assembly and associated parts are supported on an essentially flat circular mounting stem or sealing base 5 of glass, to which the dome-shaped body portion of the glass envelope E is fused, as indicated at 6 in Fig. 1. The usual exhaust tubulation 7 is conveniently located in the center of this mounting base 5.

The four electrode lead-in rods 10, 11, 12 and 13 for the anode, control grid, cathode return and heating current connections, respectively, are anchored in conventional metal-to-glass seals in the sealing base 5, preferably in an approximate circle and in a distinctive pattern of spacing as shown in Fig. 2, so that the tube must be in a predetermined position to be mounted on the tube chassis or supporting body.

The cathode K is assumed to be a directly heated corrugated slotted cylinder, such as disclosed in the prior patent of D. V. Edwards et al., No. 2,111,506, March 15, 1938. As described more in detail in this prior patent, this type of cathode comprises a strip of relatively thin nickel, having a number of narrow slots in a staggered relationship, which is rolled into a cylinder and corrugated for stiffness, and which has extensions or tabs at the ends of the cylinder. When a source of heating current is connected to the tabs at the opposite ends of the cathode cylinder, the flow of current through the body of the cylinder is restricted by the slots therein to a plurality of zig-zag paths in multiple, and this current heats the cathode to the appropriate emissive temperature. The surface of this slotted cylindrical cathode is provided with an emissive coating, preferably of the barium nickelate type, such as disclosed in the prior patent of D. V. Edwards et al., No. 2,081,864, May 25, 1937.

The heat shield HS for this cathode K, in the particular structure illustrated, comprises a cylindrical can 16 of nickel having top and bottom ends 17, 18 with peripheral flanges welded to the cylindrical wall of this can. The bright nickel walls of this heat shield can 16 reflect back toward the cathode any heat radiated by it, thereby conserving the heating current required to maintain the cathode at its emissive temperature. This heat shielding effect may be increased by additional spaced walls or reflecting surfaces; and in the particular structure illustrated, a sheet 20 of nickel, having a large number of small pimples or protuberances punched therein in a random space relationship, is wrapped around the outside of the cylindrical surface of the heat shield can 16, in a plurality of layers, two being illustrated. The layers or wrappings of this pimpled nickel sheet 20, which is preferably attached to the heat shield can 16 by spot welding at a suitable number of points, have their surfaces separated slightly by the pimples, and thus provide the heat shielding effect of a plurality of spaced heat reflecting walls. Similar circular sheets 21 and 22 of pimpled nickel are used for the ends of the heat shield can 16, only one such pimpled sheet being illustrated for each end to avoid obscurity in the drawing.

The tabs 25 at the upper end of the slotted corrugated cathode cylinder are attached to the upper end of the heat shield HS, preferably by a welded connection between the peripheral flange of the top 17 and cylindrical wall 16 of this heat shield can. The tabs 26 at the lower end of the slotted cylindrical cathode are welded to the bent upper end of a rod 27, which passes through a short tubular insulator 28 of steatite, or like heat resistant material, which has a relatively tight fit in a central hole in the bottom 18 of the heat shield can, and passes through clearance holes in the pimpled sheets 22 attached to this bottom. The top of the heat shield can 16 has a discharge opening 30 therein, preferably rectangular in cross section to correspond to the rectangular cross section of the narrow slot discharge openings in the grid G and its shields (see Fig. 3).

This structure just described provides a conventional heat shielded hot cathode of the directly heated type, which is typical or representative of a cathode structure suitable for the tube of this invention.

The heat shielded cathode is surrounded by another metallic body, in the form of a cylinder with closed ends, which constitutes what is conveniently termed a grid radiator. This grid radiator, designated as a whole GR, comprises a cylindrical body 33, preferably of nickel, a top constituting the lower grid shield 2–GS and a bottom member 35. Peripheral flanges of these top and bottom members are welded to this cylindrical body. The lower grid shield 2–GS has a discharge opening 36 therein aligned with the discharge opening 30 in the heat shield HS. This grid radiator GR has its outer surface sandblasted, or otherwise roughened or surface treated, so as to radiate heat as efficiently as possible; whereas the inner surface of this cylinder is bright, and even polished if desired, to reflect heat radiated from the heat shield HS.

The grid radiator can GR encloses and supports the heat shielded cathode, and is electrically connected with the heat shield HS to form part of the cathode return circuit. Although the parts are shown separated for clarity of illustration, the bottom 18 of the heat shield HS in effect rests on the bottom member 35 of the grid radiator can, and is anchored thereto by two straps or tabs 37 (see Figs. 4 and 8), which have their ends welded between the flanges of the cylindrical and end portions of these cans. Thus, the bottom of the grid radiator can GR constitutes a solid foundation, so to speak, for mounting and supporting the heat shielded cathode with substantial stability against movement endwise of the tube envelope. Sidewise displacement of the heat shielded cathode is limited by a plurality of insulating sleeves, as later described and indicated in Fig. 5.

The lower end of the rod 27, which is connected to the lower end of the cathode K, is connected by a strap 29 to the lead-in rod 13 (see Figs. 1 and 2). One looped or doubled end of this strap 29 is welded to the lead-in rod 13, and its other end is welded around the cathode connecting rod 27. The other lead-in rod 12 for the cathode return circuit is connected to the bottom member 35 of the grid radiator can GR in a similar manner by a strap 40, which has one looped end welded to said lead-in rod 12, and its other end welded around the bent end of a bar 41 welded at a number of points to said bottom member 35 (see Figs. 2 and 3).

The grid radiator can GR as a whole is supported upon the mounting base 5 against tilting movement in one plane by two metallic sleeves 38 and 39 around the lower ends of the anode and grid leads 10 and 11. These sleeves 38 and 39 have their flanged upper ends welded to the bottom member 35 of the grid radiator can, and rest at their lower ends on the mounting base 5 around the seals for the lead-in rods 10 and 11. The grid radiator can GR is also supported against tilting movement in a different plane by resting upon collars 32 (see Fig. 2) and 62 (see Fig. 1) of steatite, or other suitable heat resistant material, which are disposed on the lead-in rods 12 and 13 and engage with the straps 29 and 40 fixed to these rods. The metal sleeves 38 and 39, around the lead-in rods 10 and 11, and the insulator collars 32 and 62 on the lead-in rods 12 and 13 in effect provide four pillar-like supports for the grid radiator can GR and attached electrode assembly. The anode and grid lead-in rods 10 and 11 act to hold this grid radiator and electrode assembly down on its pillar-like supports. In performing this function these rods 10 and 11 are under tension, and being straight are not subject to bending moments.

This type of supporting structure for the tube elements affords the desired rigidity to maintain the masses of these tube elements in position under shock and vibration in a manner which avoids the application of material bending moments to the electrode lead-in rods. As previously indicated, this permits the cross section and length of the lead-in rods to be designed for electrical and heat conduction, rather than mechanical rigidity under bending moments, thereby enabling the appropriate temperature gradient between their seals and their hot electrode masses to be obtained in smaller dimensions. In this connection, the anode and grid lead-in rods 10 and 11 in extending from the sealing base 5 to the location of the anode and grid of the tube assembly inherently have a length to provide the appropriate temperature gradient between their seals and the connections to their hot electrodes at operating or degassing temperatures. The lead-in connections 12 and 13 for the cathode circuit extend to parts located closer to the sealing base. The strap connectors 29 and 40 for these shorter lead-in rods 12 and 13, however, have a large ratio of radiating surface to cross section, and are disposed edgewise with their flat surfaces in position for effective radiation of heat to the outside of the tube, as best shown in Fig. 2. Thus, the temperature gradient along the lead-in connections for the cathode circuit afforded by the lead-in rods 12 and 13 and the connecting straps 29 and 40 is made comparable with the longer straight anode grid lead-in rod 10 without adding to the length of the tube. These features of electrode supporting against jar and vibration, and the structural arrangement and proportioning of the electrode lead-in connections, cooperate to give a tube which is short and squatty for its current rating.

The anode A, the upper and lower grid shields 1–GS and 2–GS, and the control grid G in the tube structure of this invention are essentially flat plates, preferably of nickel and circular in form. These plates have the appropriate thickness for their heat conduction requirements, and are also interconnected and cross braced together, with multiple insulator spacers, to constitute an assembly of substantial rigidity to establish and maintain the desired closely spaced relationship between these tube elements. This assembly of electrodes and grid shields is primarily supported directly by the sealing base 5 by the grid radiator can GR in cooperation with the lead-in rods 10 and 11 for the anode and grid.

The anode A, which in tubes of the type contemplated assumes a high temperature in operation, has its upper surface sand blasted or otherwise treated for efficient radiation of heat to the outside of the tube. Its thickness is selected to conduct heat readily from its central electron receiving area to the other portions of its surface, so as to dissipate more effectively the heat received by the anode during operation of the tube.

In the particular arrangement illustrated, the anode lead-in rod 10 extends through the space between the heat shield HS and the cylindrical wall 33 of the grid radiator can GR, and through clearance openings in the grid shields 1–GS, 2–GS and the grid G. Among other things, this disposition of the anode lead inside rather than outside of the grid radiator can, serves to afford the desirable electrostatic shielding of the anode lead from the grid lead, and also isolation of the anode lead (which assumes high potentials in the operation of the tube) from the main body of the ionized medium. The lower end portion of the anode lead-in rod 10 outside and below the grid radiator can GR is surrounded by the metal sleeve 38 attached thereto and at cathode potential, which provides similar electrostatic shielding of parts at anode potential from parts at grid potential. This anode lead-in rod 10 is surrounded throughout its length by a tube 47 of steatite, quartz, or like heat resistant material, which electrically insulates this rod from other parts, including the metal sleeve 38, and also electrically isolates it from the gas filling inside the grid radiator can GR. This insulating sleeve 47 also cooperates with other similar sleeves to limit sidewise displacement of the heat shielded cathode, as later described.

In the arrangement shown for providing an electrical connection with the anode A and its lead-in rod 10, the upper end of this rod passes through a slot in the periphery of the anode A, where said rod is welded to an integral flange or lip 46 of the anode.

The lead-in rod 11 for the control grid G extends in a similar manner from its seal in the mounting base 5 through the space between the heat shield HS and the cylindrical wall 33 of the grid radiator can GR, is enclosed in a similar tubular insulator 48, and is welded to an integral flange 49 of the grid G. The metal sleeve 39 around the lower end of the grid lead-in rod 11 shields it from charges on the envelope walls.

In order to establish and maintain the desired closely spaced relationship of the anode, grid shields, and grid, these parts are interconnected, and yet insulated from each other at a plurality of places (four as shown) distributed over or spaced over their surfaces near the periphery by the cooperation of insulator spacers and the anode and grid lead-in rods, together with two other supporting rods more conveniently described later. This arrangement provides an assembly of substantial rigidity, which is capable of maintaining, in spite of jar and vibration or the tendency of the parts to be warped or distorted by heat, the closely spaced relationship between these electrodes and shields desirable for high voltage ratings and tube performance.

In the structure illustrated, four rods (including the anode lead 10) extend through clearance openings in the anode A, upper and lower grid shields 1-GS and 2-GS, and the grid G, as best shown in Fig. 3, and these rods are surrounded by spacing insulators to maintain these parts in the desired space relationship.

Referring to the arrangement of spacing insulators for the anode supporting lead 10, which is typical of the others, pairs of washers 50 of steatite, or like heat resistant insulating material, are disposed around this lead-in rod between the anode A, grid G, and the grid shields, as shown in Fig. 1. These washers 50 are formed to have a central portion or hub thicker than their peripheral portions, so that when these washers are superimposed, as shown in Fig. 1, there is a narrow deep groove or recess in their peripheries at their abutting surfaces, such recess being designated 51 for the pair of insulated washers for the upper end of the anode lead-in rod 10 in Fig. 1. This peripheral recess 51 is relatively narrow as compared with its depth, so that vaporized metal or other conductive material which may be deposited on the exposed surfaces during the fabrication or operation of the tube, will not accumulate on the bottom or side walls of this recess to a degree to constitute a continuous conductive film. In this connection, in tubes of this type, where the electrodes and associated parts have to be brought to a relatively high temperature for adequate degassing, nickel or other metals used in the tube assembly are likely to be vaporized to some extent, and this metallic vapor tends to deposit on exposed surfaces to form a conductive film. If the surface of an insulator between metallic surfaces of electrodes or the like should accumulate such a metallic film of a continuous or an uninterrupted character, a conductive path would be formed to permit some exchange of current or potential between such electrode surfaces that would interfere with the performance of the tube. The recess 51 in the periphery of the pair of insulator washers 50, together with the crack likely to exist between the two separate washers, is effective to break up the continuity of any such conductive film of vaporized metal, and maintain the desired electrical isolation of the electrode surfaces separated by such insulators.

Similar spacing insulators and interconnections for two other approximately diametrically opposite points of this electrode and shield assembly are obtained by two dummy rods 56 and 57 (see Fig. 3) which have their lower bent ends welded to the underside of the lower grid shield 2-GS (constituting the top of the grid radiator can GR), and which are connected at their upper ends by a cross member 58 welded thereto. The fourth point for spacing insulators and interconnection of this assembly is provided by another dummy rod 59 approximately diametrically opposite the anode lead-in rod 10 nearly in line with the grid lead-in rod 11. This dummy supporting rod 59 has a bent lower end welded to the underside of the grid shield 2-GS, and extends through clearance holes in the grid G, upper grid shield 1-GS, and anode A, with a pair of insulator washers 50 in each place, together with a pair of washers 50 engaging the top of the anode A, and held down by a short welded cross member 53 (see Fig. 1). Except for the insulator washers 50, this arrangement of parts for obtaining the desired cross bracing and rigidity of the electrode and shield assembly is best shown in Fig. 3.

Figure 5:
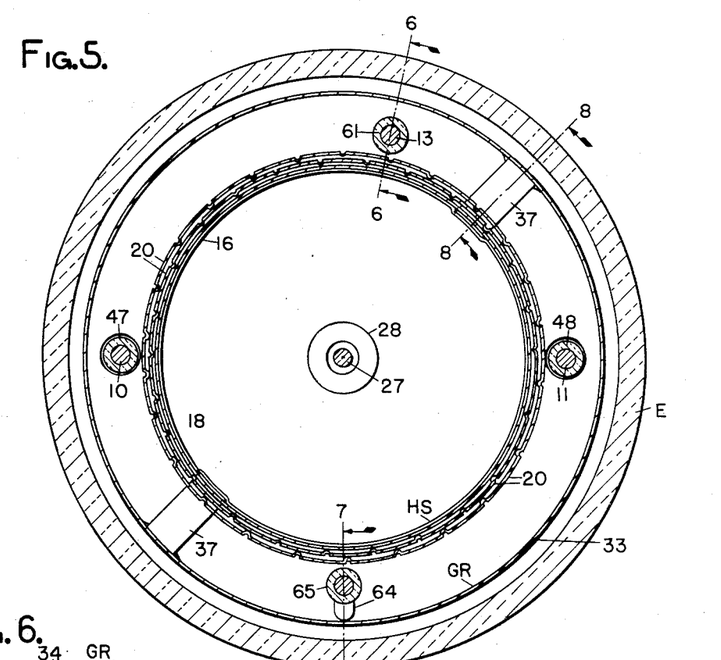
Fig. 5 is a transverse section through the tube on the line 5—5 in Fig. 1.
Figure 6:
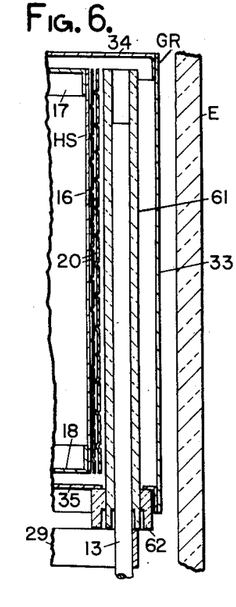
Figs. 6, 7 and 8 are partial sections on the line 6—6, 7—7 and 8—8 of Fig. 5, to illustrate the details in construction of parts that do not clearly appear in the other views.
Figure 7:
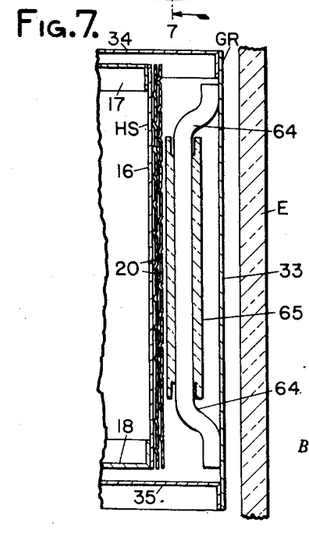
Figure 8:
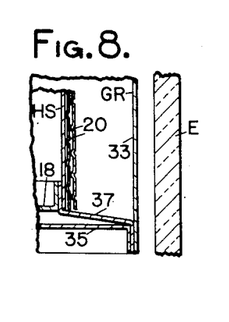

As previously indicated, the heat shield HS and enclosed cathode are supported on the bottom member 35 of the grid radiator GR, and are attached thereto by straps or tabs 37 (see Figs. 4 and 8). This heat shield HS and cathode have substantial mass; and it is desirable to provide additional restraints against its tilting movement with respect to the grid radiator GR under shock and vibration. In the arrangement shown, the tubular insulators 47 and 48 on the anode and grid lead-in rods 10 and 11 respectively are arranged to engage the heat shield HS at two points approximately diametrically opposite, as shown in Figs. 1 and 5. This prevents sidewise displacement or tilting of the heat shield HS in one vertical plane. The lead-in rod 13, to which the strap 29 is fastened for supplying heating current to the lower end of the cathode, may be extended, as best shown in Fig. 6, into the space between heat shield HS and the grid radiator GR; and a tubular insulator 61 (see Fig. 6), similar to those on the anode and grid lead-in rods 10 and 11, engages the heat shield HS to limit its movement in one direction in another vertical plane (see Fig. 5). The tubular insulator 61 on the extension of the lead-in rod 13, together with the auxiliary bushing 62 (see Fig. 6), are preferably provided with recessed lower ends for the purpose of preventing the accumulation of any continuous film of vaporized metal on the exposed surfaces of these insulators, which would otherwise afford a conductive path between this lead-in rod 13 and the grid radiator can GR, and in effect short-circuit the cathode. Referring to Figs. 5 and 7, a dummy rod 64 is welded at its ends to the inside of the cylindrical wall 33 of the grid radiator can GR, and carries a tubular insulator 65 to engage the heat shield HS and limit its motion in another direction. This tubular insulator 65 is preferably provided with recessed ends for the same purpose previously explained.

Thus, as best shown in Fig. 5, four insulated supports are arranged to engage the outer periphery of the heat shield HS at approximately equal intervals, and act to provide the heat shield HS and the enclosed cathode with the desired stability and rigidity of support against sidewise movement.

As previously indicated, the conventional base and socket mount for gas tubes not only adds to the space requirements for the use of a given tube envelope in an equipment unit, but also imposes undesirable limitations upon the dissipation of heat from the external connections to the electrodes. In accordance with this invention, the tube is bodily supported on a baseless mount to provide exposed heat dissipating surfaces, as well as detachable current conducting connections for the terminals of the main tube supporting body. As previously explained, the baseless mount serves to keep the seal region cool, and enables the use of a shorter anode lead-in rod and reduction in the overall length of the tube for its current rating.

Considering the type of baseless tube mount illustrated, and referring to Figs. 1 and 1A, it is assumed that the chassis or main tube supporting body is provided with suitable insulated terminals, with which detachable electrical connections are to be made with the electrodes of the tube. A typical terminal of this type is shown in section in Fig. 1, and comprises in general a stud 70 fixed to the chassis plate 71, with interposed insulators 72 and 73. This stud 70 is provided with a screw 74 or like screw threaded element to form a clamped detachable connection with a corresponding supporting element or foot S of the tube. The external wiring is connected in a suitable manner to the other end of this stud 70.

In the particular structure illustrated, each of its supporting elements or feet S comprises a body portion rigidly attached to the associated lead-in rod, such as 10, and an integral curved leg which extends radially outside the periphery of the tube envelope to a convenient point for attachment of its outer end to the stud 70 of the associated chassis terminal.

A glass-to-metal seal has substantial strength lengthwise, but is likely to be overstressed by sidewise or tilting forces. Accordingly, the body portion of the supporting element is preferably arcuate (see Fig. 1A) with two upright flanges indicated at 75 and 76, which bear against the bottom of the mounting base 5 at a plurality of spaced points, when the supporting element S is fixed in place on its electrode lead-in rod. Thus, the forces applied to the supporting element S during handling and use react against the mounting base 5, and are not transmitted to the lead-in rod in a direction to damage its seal.

Each supporting element or foot S is preferably rigidly attached to its associated lead-in rod by welding. A flanged thimble or eyelet 77 to receive the end of the lead-in rod extends through a hole in the body portion of the supporting element, and the flange of this eyelet is spot welded to said body portion. While the side flanges of the supporting element S are held in contact with the glass sealing eyelet 77, the shank of this base 5 is welded to its lead-in rod.

The curved leg of each supporting element S in the particular form shown has a flat hook-shaped end, as best shown in Fig. 1A, to be clamped to the stud 70 to the associated chassis terminal by a screw 74. It will be readily apparent how endwise and turning movement of the tube with its supporting elements or feet S, in connection with loosening or tightening the screws 74, affords suitable detachable electrical connections for the application and removal of the tube, when necessary, without using the conventional base and socket mount.

The significant feature of this baseless mount in connection with the design of a squatty tube is that the supporting elements or feet S are fully exposed, and can efficiently dissipate heat by air convection outside the tube, as well as by radiation. These heat dissipating surfaces are preferably brought as close to the seals for the electrode lead-in rods in the mounting base 5 as is practicable to permit making the welded connections between such feet and lead-in rods.

Considering another aspect of the tube structure of this invention, grid emission and loss of grid control constitute one of the difficult problems in the design of a grid control gas tube. Grid emission depends upon grid temperature, and it is important that all parts of the grid should operate at a relatively low temperature level. As previously indicated, the upper and lower grid shields 1–GS and 2–GS act to screen or shield the grid G from anode and cathode heat; and such heat as these grid shields may absorb from the grid G, as well as the anode and cathode, can be effectively dissipated by the grid radiator GR to the outside of the tube, with the general result that the operating temperature of the grid is stabilized at a low temperature level.

The grid also absorbs some heat from the discharge current; and it is desirable to facilitate dissipation of such heat to avoid localized hot spots and objectionable grid emission. In this connection, the distance or spacing between adjacent edges of any opening through the grid effects the grid control ratio or ability of the grid to control initiation of a discharge by a given anode voltage. The discharge current once initiated, however, should be able to pass through the grid over a substantial area for a low arc drop. To satisfy these conditions, more particularly for tubes of the higher current ratings, it is common practice to employ a multiple grid bar type of control grid, in which the space separation between adjacent grid bars affords the desired grid control ratio, and the number of separate discharge openings between adjacent grid bars makes up the appropriate area for passage of the discharge current once initiated. In such a structure, the individual grid bars have limited capacity to conduct heat absorbed from the discharge current to the body of the grid, and tend to develop hot spots and cause grid emission. Contamination of the grid surface with emissive material from the cathode region is another likely cause of grid emission, and multiple grid bars across a discharge opening are particularly exposed to such contamination.

In the tube structure of this invention, the discharge opening through the grid G is in the form of a single narrow slot 42, as best shown in Fig. 3. The upper and lower grid shields 1–GS and 2–GS have similar slots 43 and 36. A single narrow slot 30 is also preferably used for the discharge opening through the inner can 16 of the heat shield HS (see Figs. 1 and 4). These various slots are aligned. The upper and lower grid shields 1–GS and 2–GS and the heat shield can 16 are at cathode potential; and since the lines of force of the anode electric field have to pass through the slot discharge openings of these members to reach the cathode region, as well as through the slot discharge opening 42 of the grid G, the desired grid control ratio may be obtained with a wider slot than would be required for a slot in the grid alone. A single slot opening of such width may be made long enough within the dimensional limits of the structure to afford the desired total area for passage of the discharge current.

In this construction and arrangement of parts characteristic of this invention, the body of the grid G around the edges of its single slot 42 absorbs heat from the discharge current, rather than a grid bar; and this heat may be readily conducted to other remote parts of the grid body and dissipated by radiation to the upper and lower grid shields, or from the peripheral edge of the grid to the outside of the tube. Also, in this arrangement a very limited surface of the grid is exposed to contamination by emissive material from the cathode region. In this connection, a movement of particles of such contaminating emissive material is largely along straight lines, and such particles reaching the grid are limited to those that follow such paths through the narrow slots 30 and 36 in the inner heat shield can 16 and lower grid shield 2–GS. Thus, in the tube of this invention, the probability of developing localized hot spots and surface contamination to cause grid emission is greatly reduced, while still affording the appropriate grid control ratio and area for the passage of discharge current.

From the foregoing it can be seen that the specific embodiment of the invention illustrated in Figs. 1 to 8 affords adequate rigidity in the supporting of the tube elements in the desired space relationship, the appropriate distribution and dissipation of heat to avoid control grid overheating and damaging temperatures at the glass-to-metal seals of the electrode lead-in connections, together with other desirable attributes, all in a tube that is short and squatty for its current rating and requires little space for its use in an equipment unit.

Figure 9:
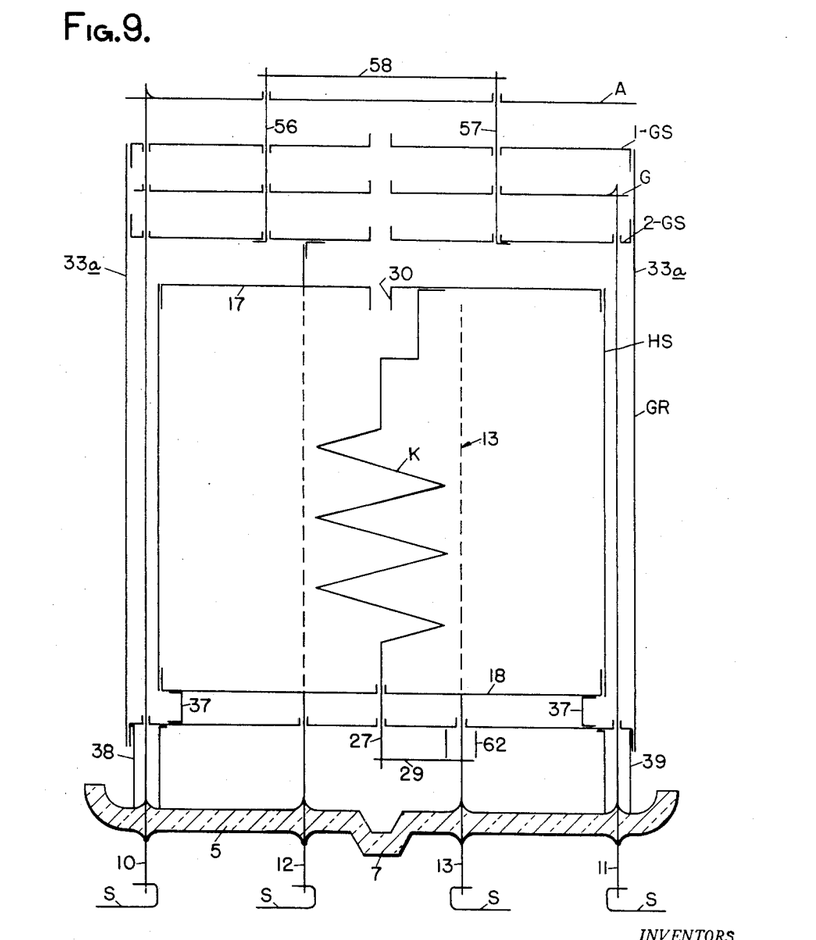
Fig. 9 is a schematic showing of a modified construction.

*Modification.*—Various features of this invention may be incorporated in different ways in a tube structure; and Fig. 9 illustrates schematically one modified construction.

In this modified structure of Fig. 9, the cylindrical wall 33a of the grid radiator can GR is extended above the lower grid shield 2–GS and connected to the periphery of the upper grid shield 1–GS by a welded flange, or similar arrangement. In this way, the grid G is wholly enclosed between the upper and lower grid shields and the cylindrical surface of the grid radiator can GR. While this prevents radiation of heat from the periphery of the grid G directly to the outside of the tube, as in the structure of Fig. 1, the grid in this modified arrangement is shielded from long ionizing paths from the edge and back of the anode A.

Also, in the modified structure of Fig. 9, the cathode return lead 12, instead of being connected by a strap 40 to the bottom of the grid radiator can GR as shown in Figs. 1 and 2, is extended up through the space between the heat shield HS and this grid radiator can, and is suitably connected to the upper part of this can, such as by a welded connection to a rod or bar welded at a number of points to the underside of a grid shield 2–GS. The length of this lead-in rod 12 thus extended affords the appropriate temperature gradient to avoid overheating its seal, much the same as the lead-in rod 10 for the anode. Also, this extension, with a suitable tubular insulator thereon (not shown), can take the place of the dummy rod 64 and tubular insulator 65 of Fig. 7 for preventing sidewise displacement of the heat shield HS and enclosed cathode K.

It should be understood that various adaptations, modifications and additions may be made in the specific structural organization shown and described, without departing from the invention.

What we claim is:

1. A gaseous discharge tube of the character described comprising, a compact assembly of electrodes including a control grid between a heat shielded hot cathode and an anode, a tube envelope having a mounting base at one end, lead-in rods for all the tube electrodes sealed in said mounting base and extending from said seals lengthwise of the envelope in approximately parallel straight lines, and means including a plurality of metal sleeves directly engaging said mounting base for supporting said electrode assembly against tilting movement with respect to said mounting base without subjecting said lead-in rods to material bending moments.

2. A gas tube of the character described comprising, a compact assembly of a control grid and grid shield between an anode and a heat shielded hot cathode, an outer grid radiator can connected with said grid shields and having its external surface treated for efficient heat radiation, means including metallic connectors and insulator spacers rigidly interconnecting said tube electrodes with said grid radiator can at a plurality of points, an envelope having a mounting base at one end, lead-in rods for all of the tube electrodes sealed in said mounting base, and means including elements engaging said grid radiator can at a plurality of spaced points and reacting against said mounting base for restraining tilting movement of said grid radiator can and attached electrode assembly in all directions relative to said base, said means cooperating with said electrode lead-in rods to support the tube elements in the envelope with substantial rigidity without subjecting the electrode lead-in rods to material bending moments.

3. A gas discharge tube of the character described comprising, a heat shielded hot cathode, an anode, a control grid and upper and lower shields between said cathode and anode, said control grid located between said upper and lower shields, an outer cylindrical metal can having its exterior surface treated for efficient heat radiation around the heat shielded cathode and directly connected with said grid shields, means including metallic connectors and insulator spacers for interconnecting and supporting at a plurality of points said grid, grid shields and anode with respect to each other and said outer can, an envelope having lead-in connections for all of the electrodes sealed in one end, and means including elements in addition to said lead-in connections for supporting said outer can and connected electrode assembly in the tube element with substantial rigidity.

4. A grid control gas tube of the character described comprising, an envelope having lead-in rods and tube electrodes, said lead-in rods being sealed in a mounting base at one end, said electrodes including a control grid between a heat shielded hot cathode and an anode, an outer heat dissipating can supported on a plurality of pillar-like elements upon said mounting base, said heat shielded hot-cathode being supported inside said outer can against endwise and tilting movement, said anode and control grid being essentially flat plates, and means including metallic connectors and insulator spacers rigidly supporting said grid and anode at a plurality of points from said outer can, whereby the tube elements are maintained in a closely spaced relationship in a compact assembly and are mounted with substantial rigidity in the tube envelope.

5. In a grid control gas tube of the character described, in combination with a hot cathode, a heat shield enclosing said cathode except for a discharge opening, an assembly of essentially flat metal elements opposite the discharge opening and constituting an anode and grid together with grid shields disposed respectively on opposite sides of the grid, means including elements of heat resistant material interconnecting said elements in an assembly of substantial rigidity and electrically insulating said anode and grid from each other and from said grid shields, and a heat radiating surface of extensive area outside said heat shield and having heat conducting connections with said grid shields for dissipating heat to the outside of the tube heat.

6. In a grid control gas tube of the character described, a compact braced assembly of essentially flat nickel plates constituting an anode, control grid and upper and lower grid shields on opposite sides of said grid; and a heat radiating element of extensive area separate from the grid and connected with said grid shields, the outer surfaces of said anode and heat radiating element being treated for efficient radiation of heat.

7. A grid control gas tube of the character described comprising, an envelope containing an ionizable medium, a hot cathode in said envelope, a heat shield comprising a plurality of spaced heat reflecting metal surfaces surrounding said cathode except for a discharge opening, an assembly of essentially flat metal elements constituting an anode, control grid and upper and lower grid shields disposed respectively on opposite sides of the grid, and a heat radiating element outside and separate from said heat shield and having heat conducting connections with said shields and an extensive surface for radiating heat to the outside of the tube.

8. In a grid control gas tube of the character described, in combination with a hot cathode, a heat shield enclosing said cathode except for a discharge opening, an anode, a control grid and a grid shield opposite each side thereof disposed between said heat shielded cathode and said anode, means including spacing elements of heat resistant insulating material for supporting said electrodes and shields in a predetermined space relationship in an assembly of substantial rigidity, said grid and shields having discharge openings therein in the form of single aligned rectangular slots, said slots having a width to afford the desired grid control ratio and a length to provide the appropriate area for the passage of discharge current between the cathode and anode at a low arc drop.

References Cited in the file of this patent

UNITED STATES PATENTS

| | | |
|---|---|---|
| 2,100,196 | Lowry | Nov. 23, 1937 |
| 2,111,506 | Edwards | Mar. 15, 1938 |
| 2,229,734 | Goodale | Jan. 28, 1941 |
| 2,456,540 | Smith | Dec. 14, 1948 |
| 2,459,277 | Halstead | Jan. 18, 1949 |
| 2,508,529 | Menzel et al. | May 23, 1950 |
| 2,650,997 | Watrous | Sept. 1, 1953 |
| 2,747,120 | Price | May 22, 1956 |